US006990560B2

(12) United States Patent
Armstrong et al.

(10) Patent No.: US 6,990,560 B2
(45) Date of Patent: Jan. 24, 2006

(54) TASK SYNCHRONIZATION MECHANISM AND METHOD

(75) Inventors: William Joseph Armstrong, Rochester, MN (US); Michael Joseph Corrigan, Rochester, MN (US); Gary Ross Ricard, Chatfield, MN (US); Timothy Joseph Torzewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 10/346,010

(22) Filed: Jan. 16, 2003

(65) Prior Publication Data

US 2004/0143712 A1   Jul. 22, 2004

(51) Int. Cl.
G06F 12/02   (2006.01)

(52) U.S. Cl. ....................................... 711/152
(58) Field of Classification Search ................ 711/152, 711/150, 151, 163; 710/200
See application file for complete search history.

(56) References Cited

U.S. PATENT DOCUMENTS

| 5,226,143 | A  | * | 7/1993  | Baird et al. ................. 711/145 |
| 5,287,521 | A  | * | 2/1994  | Nitta et al. .................. 710/200 |
| 5,454,108 | A  | * | 9/1995  | Devarakonda et al. ....... 718/104 |
| 5,987,477 | A  | * | 11/1999 | Schmuck et al. ............ 707/201 |
| 6,658,513 | B1 | * | 12/2003 | Boonie et al. ............... 710/200 |
| 6,694,411 | B2 | * | 2/2004  | Bonola ........................ 711/152 |
| 6,816,891 | B1 | * | 11/2004 | Vahalia et al. ............... 709/214 |
| 6,823,511 | B1 | * | 11/2004 | McKenney et al. .......... 718/102 |
| 2004/0064618 | A1 | * | 4/2004 | Farrell et al. ................ 710/200 |

* cited by examiner

Primary Examiner—Hiep T. Nguyen
(74) Attorney, Agent, or Firm—Martin & Associates, LLC; Derek P. Martin

(57) ABSTRACT

A task synchronization mechanism operates on a global lock that is shared between processors an on local locks that are not shared between processors. The local locks are processor-specific locks. Each processor-specific lock is dedicated to a particular processor in the system. When shared access to a resource is required, a processor updates its processor-specific lock to indicate the processor is sharing the resource. Because each processor-specific lock is dedicated to a particular processor, this eliminates a significant portion of the memory bus traffic associated with all processors reading and updating the same lock. When exclusive access to a resource is required, the requesting processor waits until the count of all processor-specific locks indicate that none of these processors have a lock on the resource. Once no processor has a lock on the resource, exclusive access to the resource may be granted.

24 Claims, 15 Drawing Sheets

```
class cacheOptimizedGate {
  enum Mode {FAST, SLOW };

// Global data is used for all slow mode operations.
  struct GlobalData {
        Gate slowGate;               // Gate to use for slow mode operations.
        Gate slowUserCountGate;      // Gate to cover count of tasks requiring slow mode.
        int  slowUserCount;          // Count of tasks requiring slow mode.
        Gate modeGate;               // Gate to cover mode.
        Mode mode;                   // Fast or Slow Mode.
  }global;

char pad[CACHE_LINE_SIZE - sizeof(GlobalData)];  /* Pad to end of cache line */

// Processor data is used by fast mode operations.
  // A fast mode operation will succeed by touching only this cache line most of the time.
  struct ProcessorData {
        // The proc Gate below is not needed if all updates to this data is done with
        // compare and swap operations. Using compare and swap is faster, but also more
        // complex and not as clear. It will not be used, but noted where possible.
        Gate procGate;                               // Gate to cover all data for a single processor.
        enum FastModes{IX, IS, NUMFASTMODES };       // could also be implemented with S, IS but no
                                                     // conflicting shared modes (e.g. IX, S) are permitted.
        int fastModeCounts[NUMFASTMODES];            // Count of gates held in each mode. Can be negative.
        Mode mode;
  };

// Proc cache line makes sure each Processor data has it's own cache line by padding to the end of
  // the current cache line.
  struct ProcCacheLine {
        struct ProcessorData data;
        char pad[CACHE_LINE_SIZE - sizeof(ProcessorData)]; /* Pad to end of cache line */
  }proc[NUMBER_OF_PROCESSORS];                       // 1 cache line per processor.
```

FIG. 12

```
/* goSlow subroutine. Details of how to transition into slow mode. */
void goSlow()
{
    // This function will make the slow gate the true gate. All operations are
    // performed on the slow gate when in slow mode.

int fastModeCounts[NUMFASTMODES] = {0};
    global.modeGate.lockX();
    global.mode = SLOW;
    for (int i = 0; i < NUMBER_OF_PROCESSORS; i++)
    {
        // Mark each per-processor cache line as being in slow mode
        // and collect the counts of the number of fast mode gate holders.

// A faster implementation can perform this entire block in
        // a single compare and swap.
        proc[i].data.procGate.lockX();
        proc[i].data.mode = SLOW;
        for (int j = 0; j < NUMFASTMODES; j++)
        {
            fastModeCounts[j] += proc[i].data.fastModeCounts[j];
            proc[i].data.fastModeCounts[j] = 0;
        }
        proc[i].data.procGate.unlockX();
    }
    // Add the counts of locks held into the slow Gate. (implemented below)
    addCountsToSlowGate(fastModeCounts);

global.modeGate.unlockX();
};
```

FIG. 13

```
void addCountsToSlowGate(int fastModeCounts[NUMFASTMODES])
{
    // This entire function could be implemented in the gate code, without the loops.

// This function places the per-processor counts of locks/unlocks into the slow gate.

// If this routine leaves the lock holding any IX or IS locks, they will be
        // unlocked when the holder does a unlockIS() or unlockIX().
        // Now that we are in slow mode, fast unlocks will go to the slow gate.

// None of these operations will block, since we were in fast mode, and all
        // the gates do not conflict.
        if (fastModeCounts[IX] > 0)
    {
            for (int i = 0; i < fastModeCounts[IX]; i++)
                global.slowGate.lockIX();           // lock once per positive count.
    }
    else
    {
            for (int i = 0; i > fastModeCounts[IX]; i--)
                global.slowGate.unlockIX();  // unlock once per negative count.
    }
        // This entire function could more efficiently be implemented in the gate code, without
the loop.
        if (fastModeCounts[IS] > 0)
    {
            for (int i = 0; i < fastModeCounts[IS]; i++)
                global.slowGate.lockIS();           // lock once per positive count.
    }
    else
    {
            for (int i = 0; i > fastModeCounts[IX]; i--)
                global.slowGate.unlockIS();  // unlock once per negative count.
    }

// At this point in time, the slow gate accurately refects the whole gate.
}
```

FIG. 14

```
/* goFast subroutine. Details of how to transition into fast mode. */
void goFast()
{
    // This routines allows the slow gate to "drift out of sync"
    // In fast mode, operations are NOT performed on the slow gate,
    // but are executed on the per-processor counts instead.

global.modeGate.lockX();
    global.mode = FAST;
    for (int i = 0; i < NUMBER_OF_PROCESSORS; i++)
    {
        // If the compare and swap is used in lockX, it must also be
        // used here.
        proc[i].data.procGate.lockX();
        // Note that the counts are NOT moved out of the gate and
        // into the per-processor data. The gate may end up appearing to be held,
        // and the per-processor counts may add up to a negative number, but when
        // the counts in the gate and in the per-processor cache lines are added,
        // the total should be a non-negative number. (assuming the gate is used
correctly).
        proc[i].data.mode = FAST;
        proc[i].data.procGate.unlockX();
    }
    global.modeGate.unlockX();
};
```

FIG. 15

```
public void lockX() {
    // Example lock code for any gate operation that CANNOT be performed in FAST
mode.
    global.slowUserCountGate.lockX();
    if (global.slowUserCount == 0)
    {
        // The most common case is that we MUST transition into slow mode to execute
this
        // operation.
        goSlow();
    }
    global.slowUserCount++;
    global.slowUserCountGate.unlockX();
    global.slowGate.lockX();
}; // end of lockX();
```

FIG. 16

```
public void unlockX() {
    // Example unlock code for any gate operation that CANNOT be performed in FAST mode.
    // Note the symmetry with the lockX code. The slow gate is dropped while still
    // keeping a slowUserCount non-zero.
    global.slowGate.unlockX();
    global.slowUserCountGate.lockX();
    global.slowUserCount--;
    if (global.slowUserCount == 0)
    {
        // The most common case is that we CAN and DO transition into FAST mode now that
        // this user no longer requires SLOW mode.
        goFast();
    }
    global.slowUserCountGate.unlockX();
}; // end of unlockX();
```

FIG. 17

```
public void lockIS() {
    // Example unlock code for any gate operation that CAN be performed in FAST mode.
    int p = getProcNumber();
    // A faster implementation can do the rest of the fast path in
    // a single compare and swap.
    bool gotTheLockFast;
    proc[p].data.procGate.lockX();
    if (proc[i].data.mode == FAST)
    {
        gotTheLockFast = true;
        proc[p].data.fastModeCounts[IS] ++;
    }
    else
        gotTheLockFast = false;
    proc[p].data.procGate.unlockX();

if (gotTheLockFast)
        /* Excellent! got the gate and only updated my private cache line. */
        return; // end of the fast path.

// Start of the slow path for "fast mode locks"
    // The slow path is marred by the need to update the global cache line.
    global.modeGate.lockS();
    if (global.mode == FAST)
        proc[p].data.fastModeCounts[IS] ++;
    else
        global.slowGate.lockIS();
    global.modeGate.unlockS();
}; // end of lockIS();
```

FIG. 18

```
public void unlockIS() {
    // Example unlock code for any gate operation that CAN be performed in FAST mode.
    int p = getProcNumber();
    // A faster implementation can do the rest of the fast path in
    // a single compare and swap.
    bool droppedTheLockFast;
    proc[p].data.procGate.lockX();

if (proc[i].data.mode == FAST)
    {
        droppedTheLockFast = true;
        // Note, it is OK for the count to go negative but the lock counts in the per-processor
        // cache lines and the slow mode gate count should all eventually produce a positive count for
        // the number of locks.
        proc[p].data.fastModeCounts[IS] --;
    }
    else
        droppedTheLockFast = false;

proc[p].data.procGate.unlockX();

if (droppedTheLockFast)
        /* Excellent! dropped the gate and only updated my private cache line. */
        return;  // end of the fast path.

// Start of the slow path for "fast mode locks"
    // The slow path is marred by the need to update the global cache line.
    global.modeGate.lockS();
    if (global.mode == FAST)
        proc[p].data.fastModeCounts[IS] --;
    else
        global.slowGate.unlockIS();
    global.modeGate.unlockS();
};  // end of unlockIS();
};
```

TASK SYNCHRONIZATION MECHANISM AND METHOD

BACKGROUND OF THE INVENTION

1. Technical Field

This invention generally relates to computer systems, and more specifically relates to apparatus and methods for sharing resources in a computer system.

2. Background Art

Since the dawn of the computer age, computer systems have evolved into extremely sophisticated devices, and computer systems may be found in many different settings. Research in the field of parallel processors has resulted in sophisticated computer systems that contain multiple processors capable of executing software tasks in parallel. In a multiprocessor system, there is typically one or more locks that allows the multiple processors to communicate with each other and to assure that certain limited system resources are available to each processor when required. Such locks typically reside in a memory that is globally accessible to all processors in the system, and indicate whether a resource on the computer system is available.

Each processor in a multiprocessor system typically includes its own instruction cache to speed the execution of code and data cache to speed accesses to memory. When a processor needs to access a resource that has access protected by a lock in globally-accessible memory, the processor must read the lock to determine whether the resource is available. In performing this read, the lock is typically read into the processor's cache. If the resource is available to the processor, the processor typically updates the lock to indicate that the processor has the resource. Because the lock is now residing in the processor's cache, this update is to the copy of the lock in the processor's cache. The cache manager detects that the lock in the processor's cache has been updated, and invalidates any other copies of the lock in other processors' caches. The cache manager then writes the updated lock from the processor's cache to main memory. The next time a different processor needs to access the lock, it must load the lock from memory into its cache, because its cached copy of the lock has been invalidated due to the change by a different processor.

For locks that are seldom accessed, the invalidation of cached copies of the lock in the caches of other processors provides little performance penalty. However, there are some locks that are accessed very frequently. One example of a frequently-accessed lock is during a seize of a database table. If the multiple processors often require shared access to a database table, the performance penalty of invalidating cached copies of the lock can become significant, and greatly increases memory bus traffic due to each processor having to retrieve the lock from memory almost each time it is needed due to its local copy being invalidated by another processor updating the lock in its own cache. Without a way to provide a synchronization mechanism that does not cause significant performance penalties when the shared resource is accessed often, the computer industry will continue to suffer from degraded performance when using known locks as synchronization mechanisms.

DISCLOSURE OF INVENTION

According to the preferred embodiments, a task synchronization mechanism operates on a global lock that is shared between processors and on local locks that are not shared between processors. The local locks are processor-specific locks. Each processor-specific lock is dedicated to a particular processor in the system. When shared access to a resource is required, a processor updates its processor-specific lock to indicate the processor is sharing the resource. Because each processor-specific lock is dedicated to a particular processor, this eliminates a significant portion of the memory bus traffic associated with all processors reading and updating the same lock. When exclusive access to a resource is required, the requesting processor waits until the count of all processor-specific locks indicate that none of these processors have a lock on the resource. Once no processor has a lock on the resource, exclusive access to the resource may be granted. By changing from a single lock to multiple processor-specific locks, significant performance benefits are achieved by eliminating the memory bus traffic associated with caching a single lock to multiple processors.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIGS. 12–19 are each diagrams that show pseudo-code of one possible detailed implementation in accordance with the preferred embodiments.

BEST MODE FOR CARRYING OUT THE INVENTION

The present invention relates to sharing or resources on a multiprocessor computer system. For those individuals who are not generally familiar with resource sharing on multiprocessor computer systems, the Overview section below presents concepts that will help to understand the invention.

1. Overview

Sharing of Resources in Known Multiprocessor Computer Systems

Figure 2:
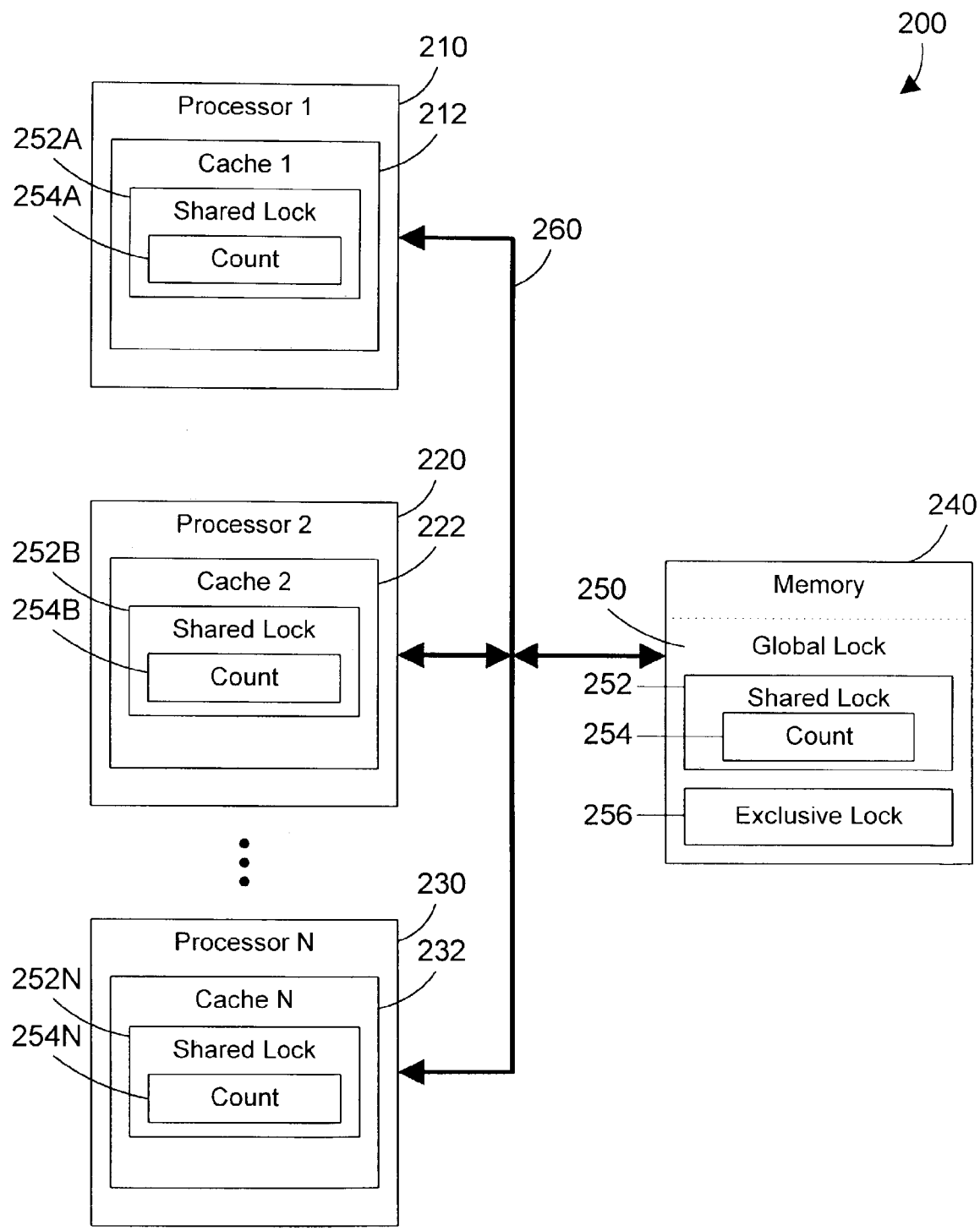
FIG. 2 is a block diagram of a sample multiprocessor computer system according to the prior art.

FIG. 2 shows a sample prior art multiprocessor computer system 200. Three processors 210, 220 and 230 are coupled to a memory 240 via a bus 260. Processor 210 includes a corresponding cache 212. In similar fashion, processor 220 includes a cache 222, and processor 230 includes a cache 232. In this specific example, each of these caches 212, 222 and 232 represent data caches for their respective processors.

Memory 240 includes a global lock 250 that is comprised of a shared lock 252 and an exclusive lock 256. The shared lock 252 includes a count 254 of the number of processes that are currently sharing the shared resource corresponding to the global lock 250.

When a processor needs shared access to the shared resource corresponding to the global lock 250, the processor attempts to set the shared lock 252. If the processor is successful at setting the shared lock 252, the count 254 is incremented to reflect the additional process sharing the shared resource, and the process can perform its desired task using the shared resource. Once the process has completed its task, the shared lock 252 is cleared, which decrements the shared count 254.

When a processor needs exclusive access to the shared resource corresponding to the global lock 250, the processor attempts to set the exclusive lock 256. Note that the processor can only set the exclusive lock 256 if there are no processes that currently have a shared lock on the resource (i.e., if the count 254 is zero). If the processor is successful at setting the exclusive lock 256, the requesting process can perform its desired task having exclusive access to the shared resource. Once the process has completed its task, the exclusive lock 256 is cleared.

Figure 3:
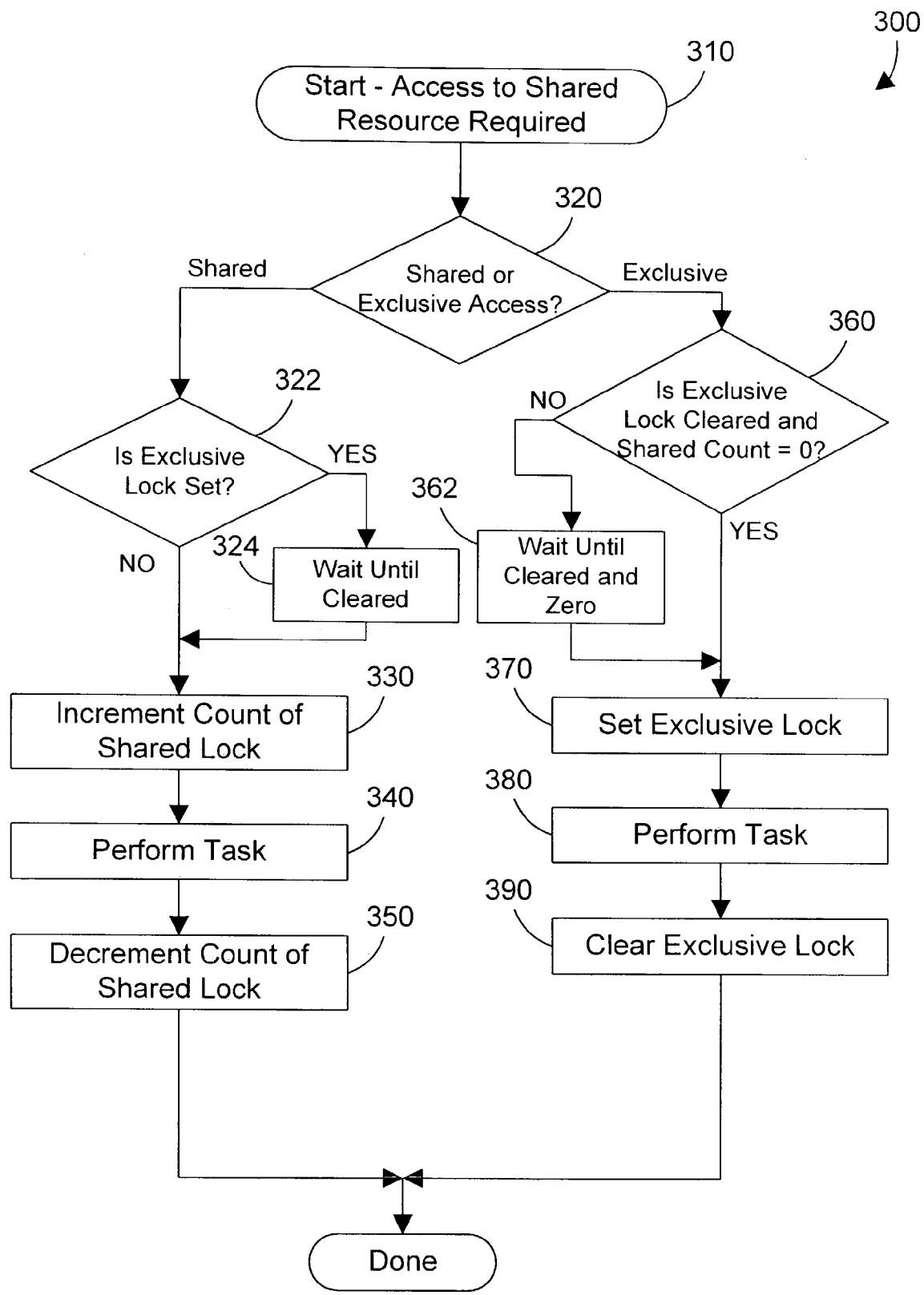
FIG. 3 is a flow diagram of a prior art method for performing tasks that require access to a shared resource that could be performed by the multiprocessor computer system of FIG. 2.

FIG. 3 illustrates one prior art method 300 for using the global lock 250 in FIG. 2 to control access to a shared resource. Method 300 begins when access to a shared resource is required (step 310). First, method 300 determines whether the requested access is shared or exclusive (step 320). If the requested access is shared, method 300 checks to see if the exclusive lock is set (step 322). If the exclusive lock is set (step 322=YES), method 300 waits until the exclusive lock is no longer set (step 324). At this point, the count of the shared lock is incremented (step 330), the task that requires shared access to the shared resource is performed (step 340), and the count of the shared lock is decremented (step 350). Incrementing the count in step 330 indicates an additional process is using the shared resource, while decrementing the count in step 350 indicates the process is finished using the shared resource.

If the requested access to the shared resource is exclusive access in step 320, method 300 determines whether the exclusive lock is set and the shared count is zero (step 360). Both of these conditions must be met to proceed to step 370. If the exclusive lock is set or the shared count is non-zero (step 360=NO), method 300 waits until the exclusive lock is cleared and the shared count is zero (step 362). If the exclusive lock is set, this means there is a process that already has an exclusive lock on the shared resource, which prevents the current process from also obtaining an exclusive lock at the same time. If the shared count is greater than zero, this means that there are still processes that have the shared lock set, which prevents exclusive access to the shared resource. Once the exclusive lock is cleared and the shared count is zero, the exclusive lock is set (step 370), which guarantees exclusive access to the shared resource. The task that requires exclusive access to the shared resource is then performed (step 380), and the exclusive lock is cleared (step 390). At this point, method 300 is done.

Figure 4:
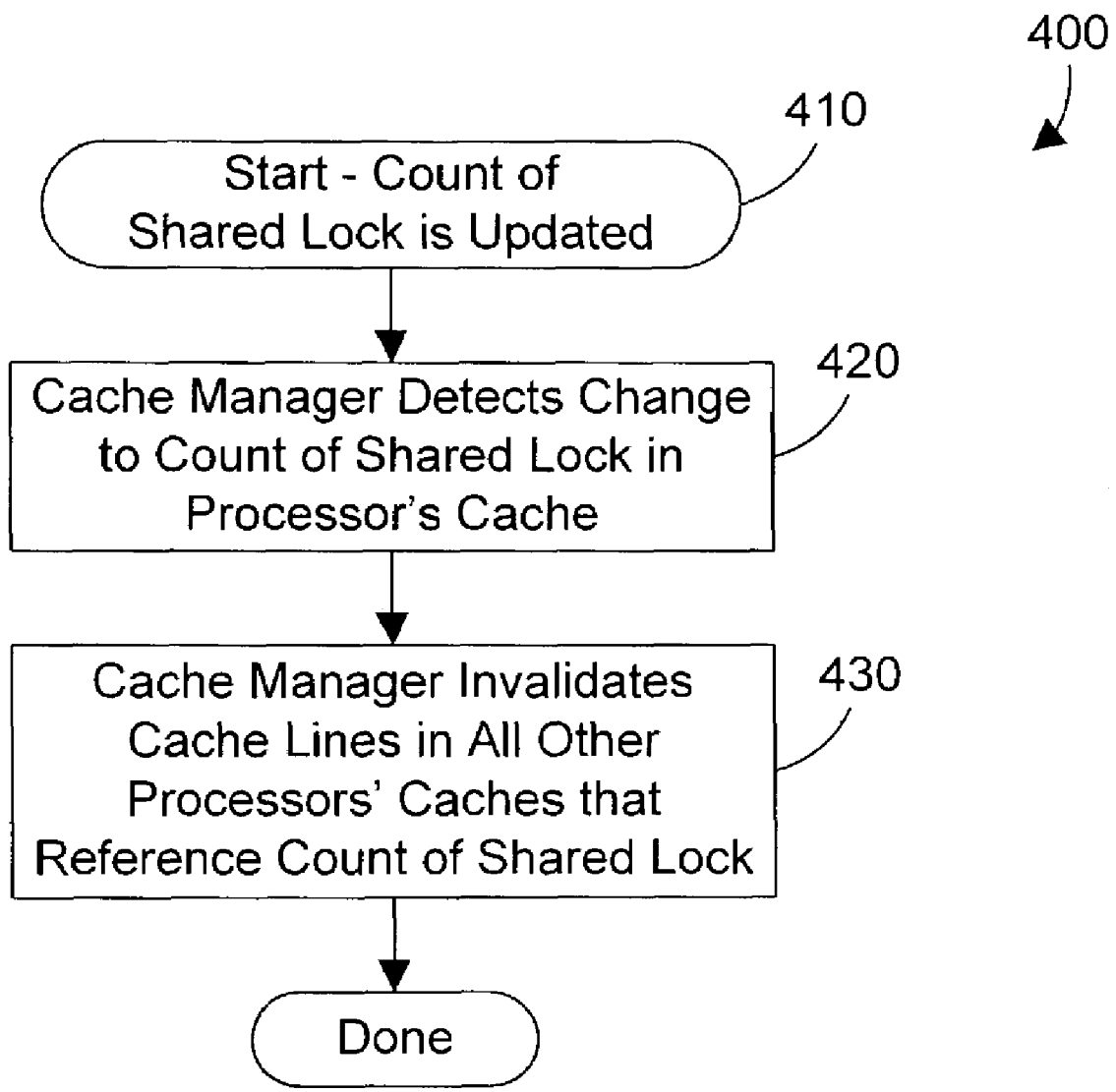
FIG. 4 is a flow diagram of a prior art method performed by a cache manager when a count of a globally shared lock is updated in a processor's cache.

With the system 200 of FIG. 2 and the method 300 of FIG. 3, a problem results that negatively affects system performance. Referring to FIG. 2, each processor includes a cache that has a copy of the shared lock 252 and count 254. Thus, in FIG. 2 the values in the cache 212 are shown as shared lock 252A and count 254A. The values in the cache 222 are shown as shared lock 252B and count 254B. Similarly, the values in the cache 232 are shown as shared lock 252N and count 254N. Shared lock 252A, 252B and 252N are copies of the shared lock 252 in memory 240, and count 254A, 254B and 254N are copies of the count 254 in memory 240. Because each processor includes a copy of the shared lock and corresponding count in its corresponding cache, when any processor changes the count value in its cache, the cache lines in the other processors that include the count value must be invalidated. The operation of the cache manager is shown as method 400 in FIG. 4. Method 400 begins when a count of a shared lock is updated (i.e., incremented or decremented) (step 410). The cache manager detects the change to the count of the shared lock in one processor's cache (step 420), and as a result, the cache manager invalidates the cache lines in all other processors' caches that reference the same count (step 430). By invalidating the cache entries of all the other processors, each processor must reload its cache with the count the next time the processor needs access to the count. The result is that a change by one processor to the count in its own cache can cause each other processor to perform memory bus transactions to reload their respective caches with the updated value. The result is that excessive memory bus bandwidth is consumed by transactions that update the count value in a processor's cache, which negatively impacts system performance.

In many computer systems, both known in the art and being currently developed, shared access to a resource may be needed very often, but exclusive access to the resource may be required only a relatively small percentage of the time. The global lock in the prior art is well-suited to ensuring exclusive access to a resource when required, but suffers from significant overhead and performance penalties when the majority of accesses are shared rather than exclusive. What is needed is a way to provide a lock mechanism that eliminates the undesirable memory bus traffic in the prior art for shared accesses while still guaranteeing exclusive access when required.

2. Detailed Description

The preferred embodiments eliminate most of the memory bus traffic in the prior art that was required to keep a global shared count current in each processors' cache in a multiprocessor computer system. Instead of providing a global lock that is used to provide both shared and exclusive access, a global lock is generally used for exclusive access, while processor-specific locks are generally used to provide shared access. Because a processor-specific lock is dedicated to a particular processor, there is no copy of one processor's lock in another processor's cache. As a result, the memory bus bandwidth that was required in the prior art to update each processor's cache each time a shared count is updated is eliminated, significantly enhancing the performance of the multiprocessor computer system.

Figure 1:
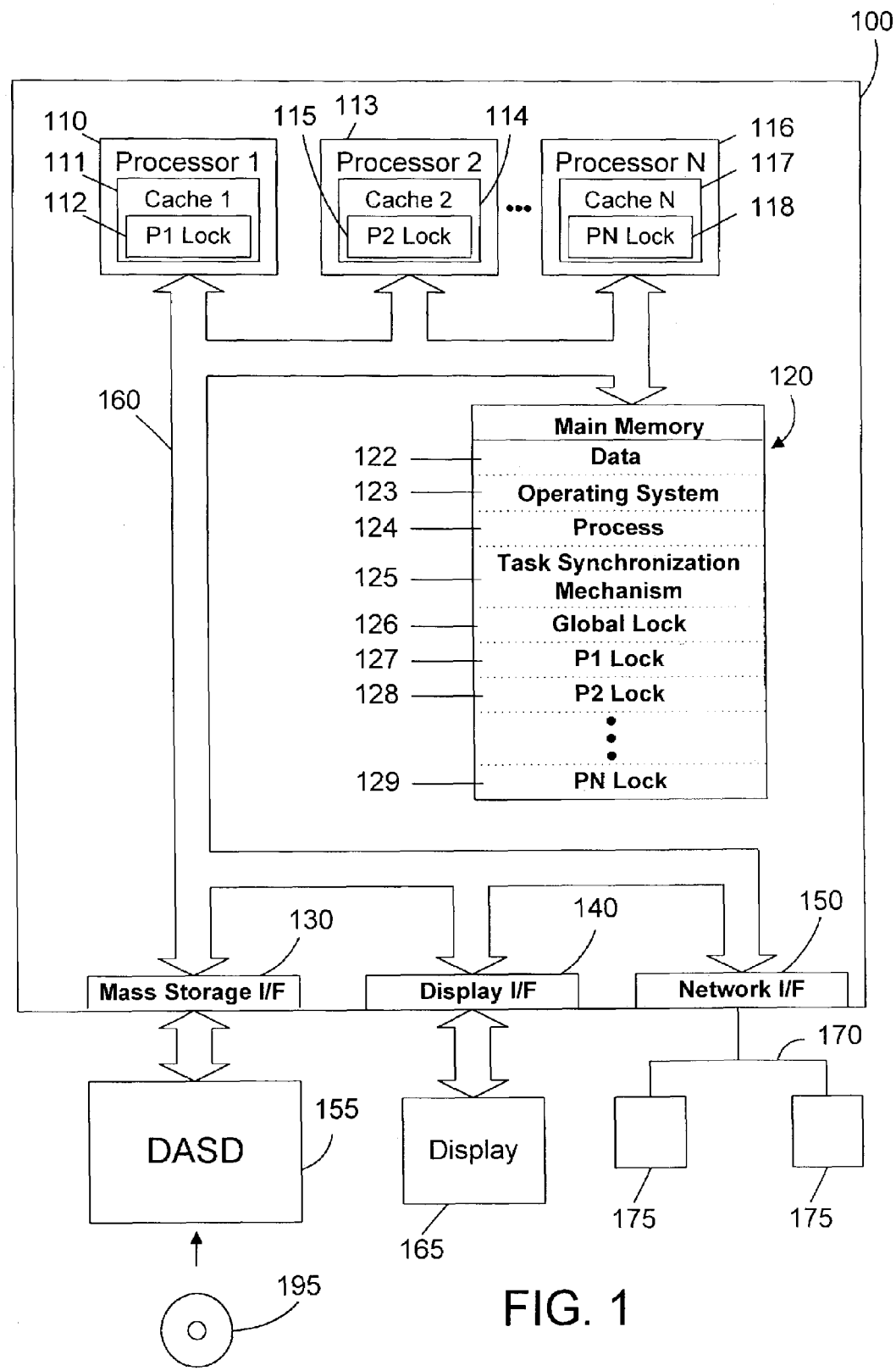
FIG. 1 is a block diagram of an apparatus in accordance with the preferred embodiments.

Referring now to FIG. 1, a computer system 100 is one suitable implementation of a computer system in accordance with the preferred embodiments of the invention. Computer system 100 is an IBM iSeries computer system that is configured with multiple processors. However, those skilled in the art will appreciate that the mechanisms and apparatus of the present invention apply equally to any multiprocessor computer system, regardless of whether the computer system is a complicated multi-user computing apparatus, a single user workstation, or an embedded control system. As shown in FIG. 1, computer system 100 comprises multiple processors (e.g., 110, 113, and 116 in FIG. 1), a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD-RW drive, which may store data to and read data from a CD-RW 195.

Main memory 120 in accordance with the preferred embodiments contains data 122, an operating system 123, a process 124, a task synchronization mechanism 125, a global lock 126, and processor-specific locks (e.g., 127, 128 and 129 in FIG. 1). Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, process 124, task synchronization mechanism 125, global lock 126, and processor-specific locks 127, 128 and 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Process 124 is representative of any process in any computer program that may require access to a shared resource. When process 124 requires access to the shared resource, the task synchronization mechanism 125 controls access to the shared resource using the global lock 126 and processor-specific locks 127–129. The global lock 126 is used to provide exclusive access to the shared resource, while the processor-specific locks 127–129 are used to provide shared access to the shared resource. The detailed function of task synchronization mechanism 125 using the global lock and the processor-specific locks is described in more detail below with reference to FIGS. 5–19.

Each processor 110, 113 and 116 may be constructed from one or more microprocessors and/or integrated circuits. Each processor 110, 113 and 116 includes a corresponding cache 111, 114 and 117, respectively. Each processor includes a processor-specific lock in its cache. Thus, processor 110 includes a cached copy 112 of the P1 lock 127 in its cache 111. Processor 113 includes a cached copy 115 of the P2 lock 128 in its cache 115. Processor 116 includes a cached copy 118 of the PN lock 129 in its cache 117. By caching processor-specific locks that control shared access to the shared resource, the network traffic in the prior art that was required to update the global shared count is eliminated, thereby significantly enhancing system performance.

Each processor 110, 113 and 116 executes program instructions stored in main memory 120. Main memory 120 stores programs and data that each processor 110, 113 and 116 may access. When computer system 100 starts up, one or more of the processors 110, 113 and 116 initially execute the program instructions that make up operating system 123. Operating system 123 is a sophisticated program that manages the resources of computer system 100. Some of these resources are processors 110, 113 and 116, main memory 120, mass storage interface 130, display interface 140, network interface 150, and system bus 160.

Although computer system 100 is shown to contain only a single system bus, those skilled in the art will appreciate that the present invention may be practiced using a computer system that has multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD-RW (e.g., 195 of FIG. 1), and transmission type media such as digital and analog communications links.

Figure 5:
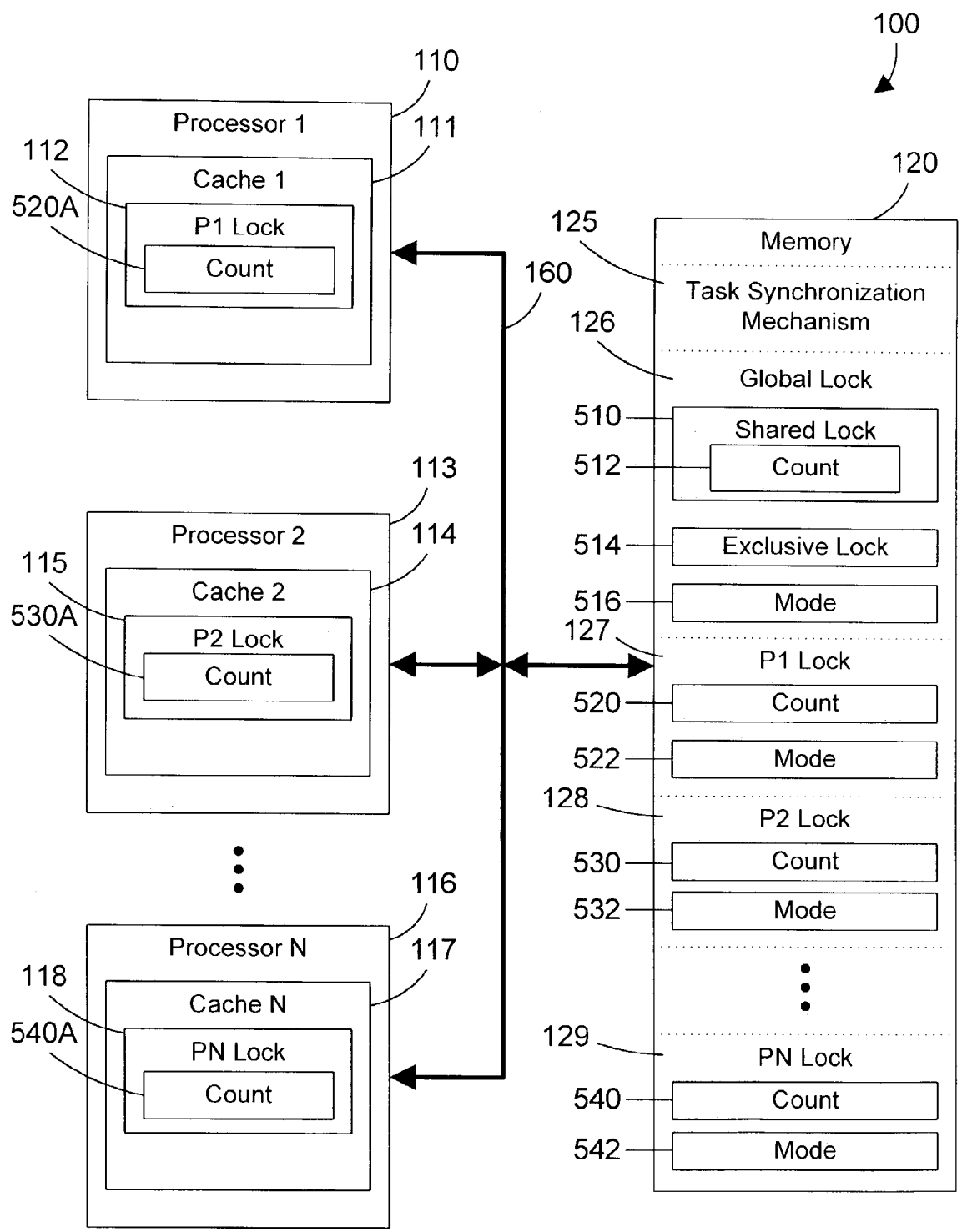
FIG. 5 is a block diagram of a multiprocessor computer system in accordance with the preferred embodiments.

Referring now to FIG. 5, multiprocessor computer system 100 in accordance with the preferred embodiments includes multiple processors 110, 113, 116 coupled to a memory 120 via a bus 160. FIG. 5 is a different view of the processors and memory shown in FIG. 1, with some additional detail. Memory 120 includes task synchronization mechanism 125, global lock 126, and processor-specific locks 127–129. The task synchronization mechanism 125 operates on the global lock 126 and the processor-specific locks 127–129 to control access to a shared resource. The global lock 126 preferably includes a shared lock 510 with its corresponding count 512, an exclusive lock 514, and a mode setting 516. The shared lock 510 with its corresponding count 512 and the exclusive lock 514 are preferably similar to the prior art implementation of global lock 250 shown in FIG. 2. The mode setting 516, however, is not present in the prior art. Mode setting 516 can be set to "fast" or "slow". In general, a fast mode setting means that processor-specific locks may be used to control shared access to a shared resource. A slow mode setting means that the global lock may be used to control shared access to a shared resource, or to control exclusive access to the shared resource. Note that other "shared" lock types may be allowed to use the processor-specific locks within the scope of the preferred embodiments, such as intent exclusive (IX) and intent shared (IS) locks that are known in the art.

The processor-specific locks 127–129 are each dedicated to a respective processor in the system. Thus, P1 lock 127 is dedicated to the first processor 110; P2 lock 128 is dedicated to the second processor 113; and PN lock 129 is dedicated to the Nth processor 116. Each processor-specific lock includes a shared count and a mode setting. Thus, P1 lock 127 includes a shared count 520 and a mode setting 522. P2 lock 128 includes a shared count 530 and a mode setting 532. P3 lock 129 includes a shared count 540 and a mode setting 542.

Each processor includes a corresponding cache that includes a cached copy of the processor-specific lock with its associated shared count. Thus, processor 110 includes a cache 111 that contains a copy 112 of the P1 lock 127 with a copy 520A of the corresponding shared count 520. In similar fashion, processor 113 includes a cache 114 that contains a copy 115 of the P2 lock 128 with a copy 530A of the corresponding shared count 530, and processor 116 includes a cache 117 that contains a copy 118 of the PN lock 129 with a copy 540A of the corresponding shared count 540.

Figure 6:
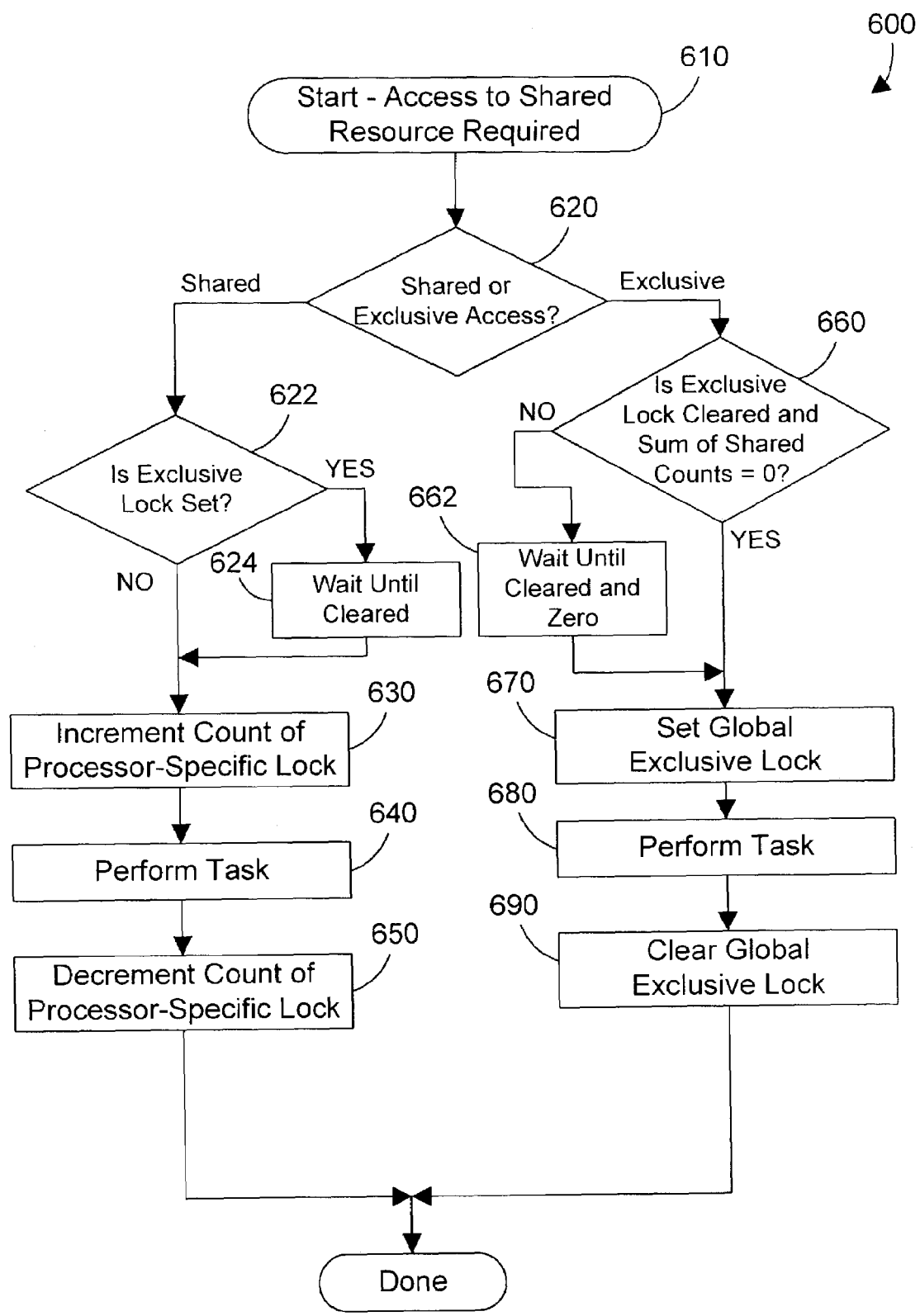
FIG. 6 is a flow diagram of a method in accordance with the preferred embodiments for performing tasks in a multiprocessor computer system.

A method 600 in FIG. 6 shows steps preferably performed by task synchronization mechanism 125 to control access to a shared resource using the global lock 126 and the processor-specific locks 127–129. Method 600 begins when a process (such as process 124 in FIG. 1) requires access to a shared resource (step 610). Method 600 first determines whether the required access is shared or exclusive (step 620). If the requested access is shared, method 600 checks to see if the exclusive lock is set (step 622). If the exclusive lock is set (step 622=YES), step 622 waits until the exclusive lock is no longer set (step 624). Once the exclusive lock is cleared, the count of the processor-specific lock is incremented (step 630), the task that requires shared access to the shared resource is performed (step 640), and the count of the processor-specific lock is decremented (step 650).

If the requested access to the shared resource is exclusive access in step 320, method 300 determines whether the exclusive lock is set and the shared count is zero (step 360). Both of these conditions must be met to proceed to step 370. If the exclusive lock is set or the shared count is non-zero (step 360=NO), method 300 waits until the exclusive lock is cleared and the shared count is zero (step 362). If the exclusive lock is set, this means there is a process that already has an exclusive lock on the shared resource, which prevents the current process from also obtaining an exclusive lock at the same time. If the shared count is greater than zero, this means that there are still processes that have the shared lock set, which prevents exclusive access to the shared resource.

If the requested access to the shared resource is exclusive access in step 620, method 600 determines whether the exclusive lock is set and the sum of shared counts is zero (step 660). The sum of shared counts is the shared count of the global lock added to the count in each processor-specific lock. If the exclusive lock is set or the shared count is non-zero (step 660=NO), method 600 waits until the exclusive lock is cleared and the sum of shared counts is zero (step 662). If the exclusive lock is set, this means there is a process that already has an exclusive lock on the shared resource, which prevents the current process from also obtaining an exclusive lock at the same time. If the sum of shared counts is not zero, this means that a process has a shared lock on the shared resource, which prevents exclusive access to the shared resource. Once the exclusive lock is cleared and the sum of all shared counts is zero, method 600 sets the global exclusive lock (step 670), which guarantees exclusive access to the shared resource. The task requiring exclusive access is then performed (step 680), and the exclusive lock is cleared (step 690). At this point, method 600 is done.

Method 600 in FIG. 6 broadly describes a method in accordance with the preferred embodiments. Note, however, that method 600 does not make use of the mode settings of the locks (see FIG. 5). Each mode setting can be set to FAST or SLOW. In general, a fast mode setting allows accessing processor-specific locks, while a slow mode setting requires accessing the global lock. Details that show how the FAST and SLOW modes are used are shown in FIGS. 7–11.

Figure 7:
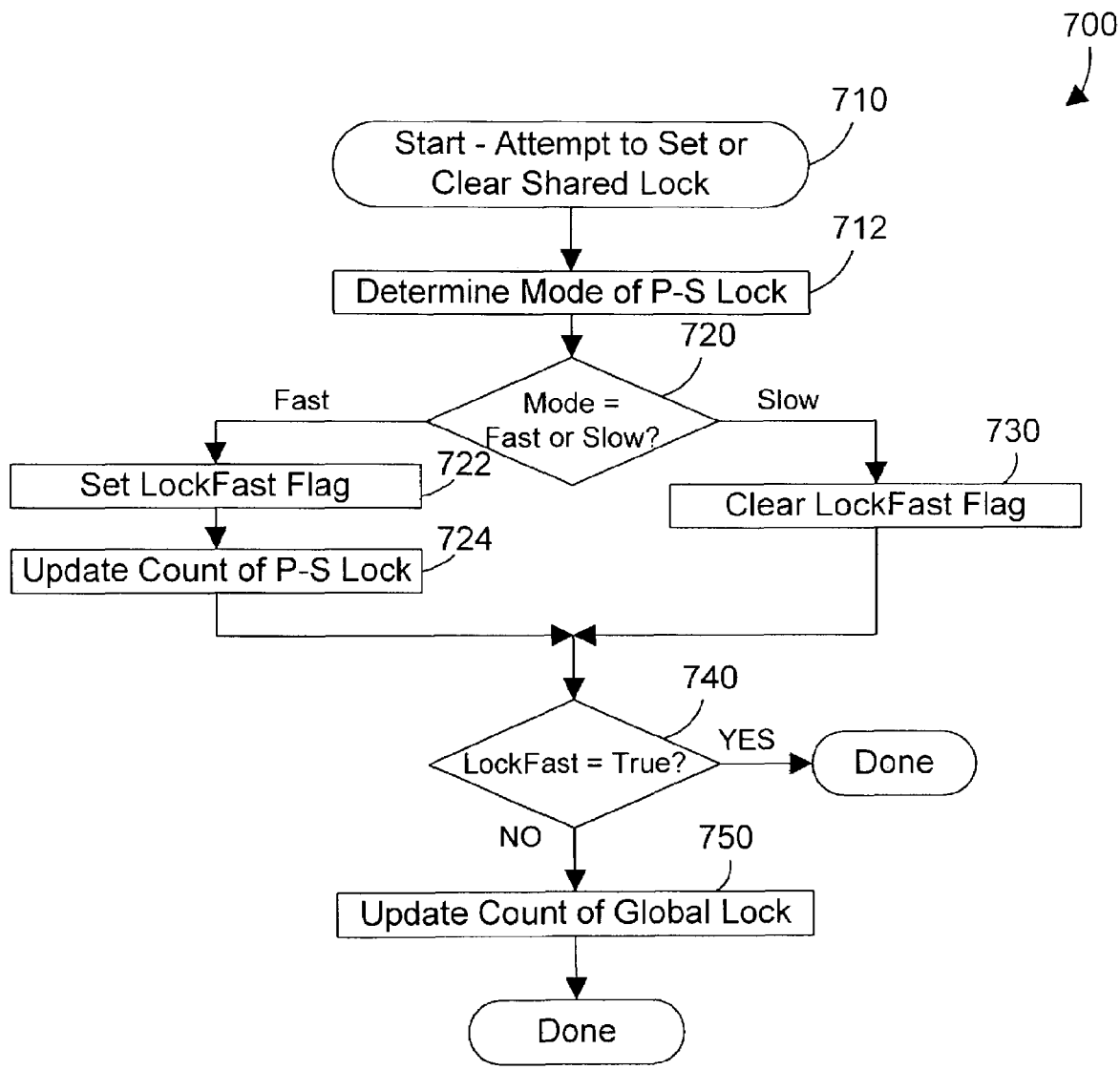
FIG. 7 is a flow diagram of a method in accordance with the preferred embodiments for setting or clearing a shared lock.

Referring now to FIG. 7, a method 700 in accordance with the preferred embodiments begins, with an attempt to set or clear a shared lock (step 710). Note that the term "shared lock" includes the processor-specific locks 127–129 in FIG. 5 and also includes the shared lock 510 within the global lock 126. First, we determine the mode setting of the processor-specific lock (step 712), and the flow depends on whether the mode is set to FAST or SLOW (step 720). If the mode of the processor-specific lock is set to FAST, method 700 sets a flag called LockFast to TRUE (step 722), and updates the count of the processor-specific lock (step 724). If the mode of the processor-specific lock is set to SLOW, the LockFast flag is cleared to FALSE (step 730). The value of the LockFast flag is then tested in step 740, and if TRUE (step 740=YES), method 700 is done. If LockFast is not TRUE (step 740=NO), this means that the mode of the processor-specific lock was set to SLOW. The count of the global lock is updated (step 750), and method 700 is done. Method 700 represents detailed steps that could implement steps 630 and 650 in FIG. 6. If method 700 is used to implement step 630, the updating of counts in method 700 will consist of incrementing the counts. If method 700 is used to implement step 650, the updating of counts in method 700 will consist of decrementing the counts.

Figure 8:
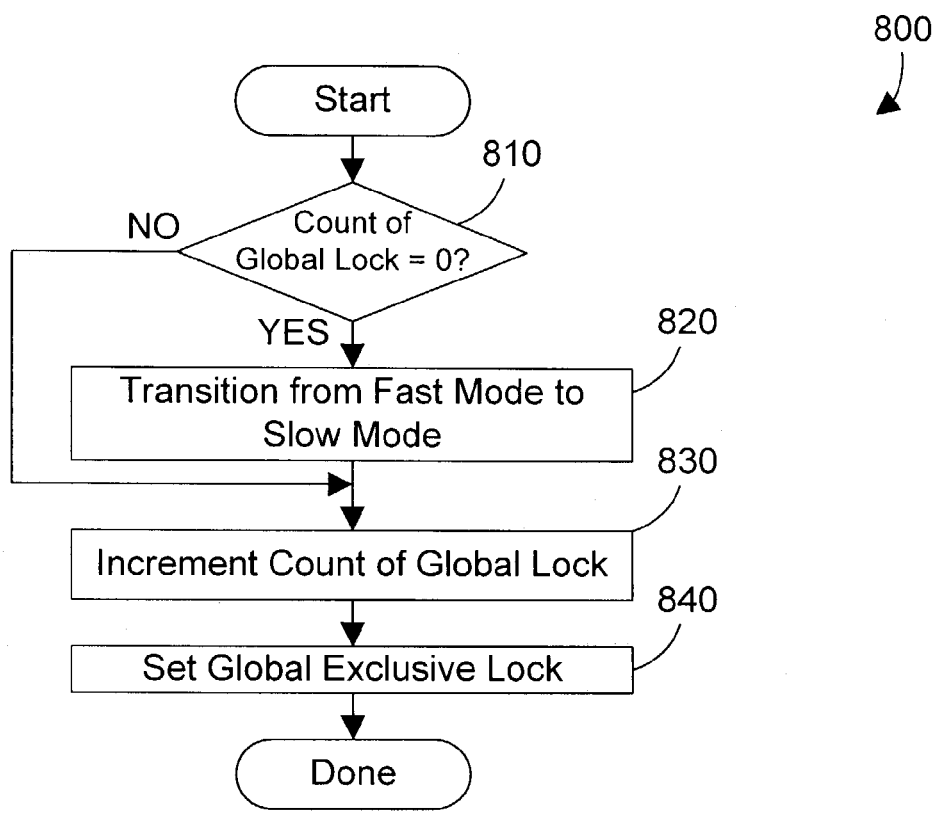
FIG. 8 is a flow diagram of a method in accordance with the preferred embodiments for setting an exclusive lock.

FIG. 8 shows a method 800 in accordance with the preferred embodiments for setting an exclusive lock. If the count of the global lock is not zero (step 810=NO), the count of the global lock is incremented (step 830) and the global exclusive lock is set (step 840). If the count of the global lock is zero (step 810=YES), method 800 transitions from fast mode to slow mode (step 820) before incrementing the count of the global lock (step 830) and setting the global exclusive lock (step 840).

Figure 9:
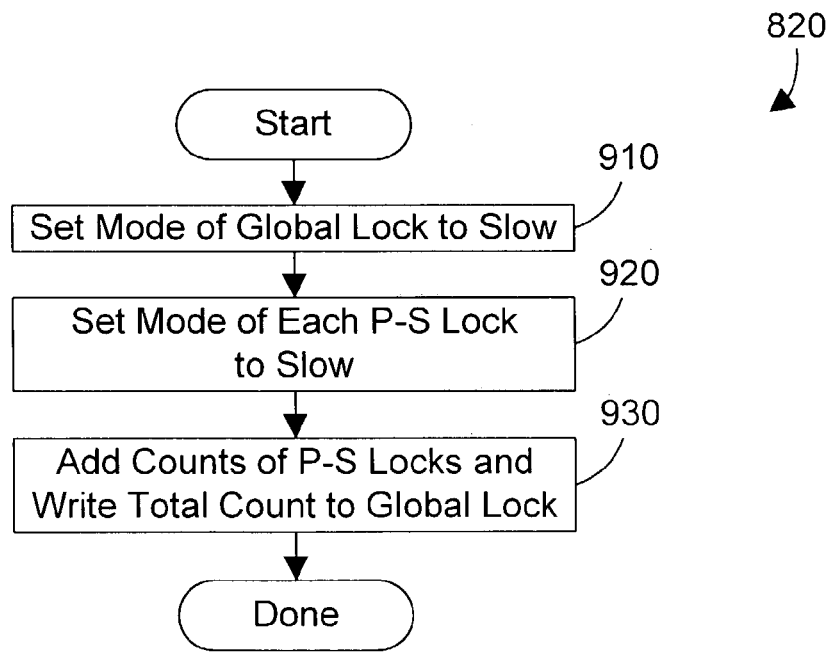
FIG. 9 is a flow diagram of a method in accordance with the preferred embodiments for transitioning from fast mode to slow mode.

Details for transitioning from fast mode to slow mode in step 820 of FIG. 8 is shown as a method 820 in FIG. 9. First, the mode of the global lock is set to SLOW (step 910). Next, the mode of each processor-specific lock is set to SLOW (step 920). The counts of the processor-specific locks are then summed together, and the total count is written to the count of the global lock (step 930). In this manner, the global lock now includes all information in the processor-specific locks.

Figure 10:
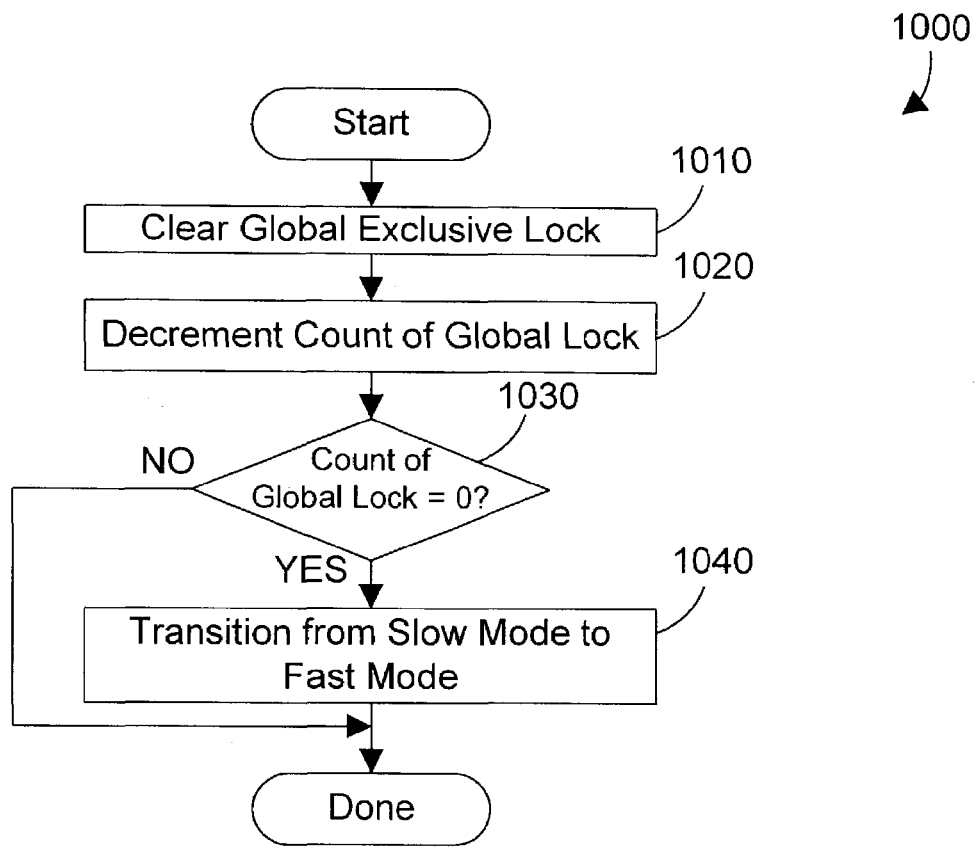
FIG. 10 is a flow diagram of a method in accordance with the preferred embodiments for clearing an exclusive lock.

FIG. 10 shows a method 1000 in accordance with the preferred embodiments for clearing an exclusive lock. First, the global exclusive lock is cleared (step 1010). Next, the count of the global lock is decremented (step 1020). If the count of the global lock is zero (step 1030=YES), a transition is made from slow mode to fast mode (step 1040). Otherwise (step 1030=NO), method 1000 is done.

Figure 11:
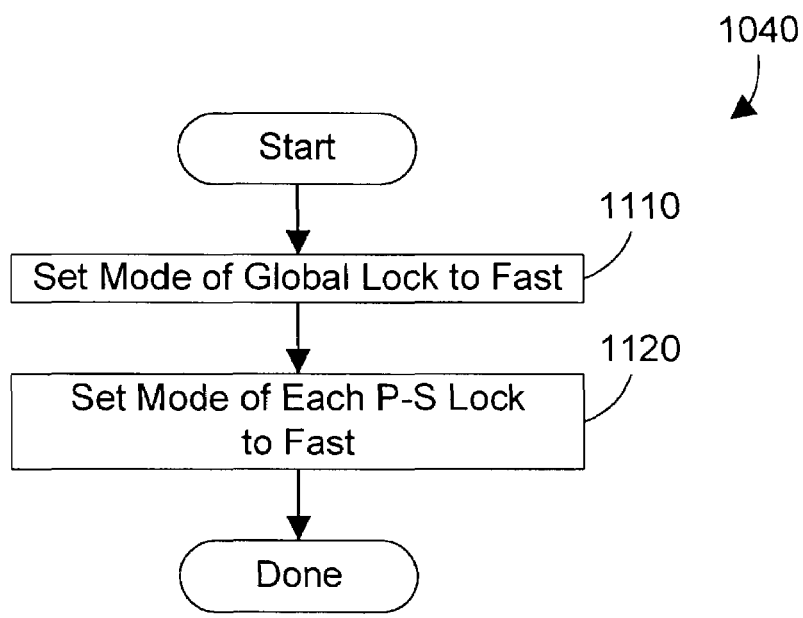
FIG. 11 is a flow diagram of a method in accordance with the preferred embodiments for transitioning from slow mode to fast mode.

Details for transitioning from slow mode to fast mode in step 1040 of FIG. 10 is shown as a method 1040 in FIG. 11. The mode of the global lock is set to FAST (step 1110). The mode of each processor-specific lock is then set to FAST (step 1120). Note that method 1040 does not attempt to transfer or allocate the count in the global lock to the processor-specific locks. The result is that the count of the global lock may appear to indicate the global lock is held when it is not, and the processor-specific counts may add up to a negative number, but when the count in the global lock is added to the count in all processor-specific locks, the total will be a non-negative number that accurately represents the total number of set locks.

A detailed implementation in accordance with the preferred embodiments is shown in the pseudo-code of FIGS. 12–19. This pseudo-code is targeted to an IBM iSeries computer system, so the terminology is the pseudo-code is specific to the iSeries implementation. Thus, a "lock" as described above is referred to as a "gate" in the pseudo-code. A "gate" in iSeries parlance is used to control access to something. Thus, the pseudo-code references a processor-specific gate that corresponds to the processor-specific lock discussed herein. In addition, the pseudo-code also references a global gate that corresponds to the global lock discussed herein.

A detailed explanation of the pseudo-code is not provided herein, because the extensive comments in the pseudo-code would allow one or ordinary skill in the art to discern how the code functions to implement the claimed invention. A reader that is skilled in the art will appreciate that FIGS. 5 and 6 represent a broad implementation in accordance with the preferred embodiments, FIGS. 7–11 represent an implementation in accordance with the preferred embodiments that includes more details relating to the use of the FAST and SLOW modes, and FIGS. 12–19 represent a detailed implementation in code in accordance with the preferred embodiments. In this manner a broad spectrum of the preferred embodiments is provided, from a broad view to a very detailed implementation in code.

The preferred embodiments greatly enhance the performance of a multiprocessor computer system by providing processor-specific locks that may be used in fast mode when shared access is required, while still providing full functional support in slow mode when exclusive access is required. The use of processor-specific locks eliminates significant memory bus traffic that is required in the prior art to update cache lines in each processor that correspond to a common global lock. However, providing an exclusive lock will likely be more time-consuming than in the prior art, because the count of all shared locks must be read and summed together, possibly many times, before the sum is zero, which allows an exclusive lock to be set. In many computing environments, a shared resource is accessed in shared mode very often, while the same shared resource is accessed in exclusive mode very rarely. By providing a significant performance advantage for the shared resource in shared mode, which is the vast majority of accesses, at the expense of a slight penalty in exclusive mode, which is a small minority of accesses, the net result is a vast improvement to system performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   a plurality of processors;
   a memory coupled to the plurality of processors;
   a global lock residing in the memory;
   a plurality of processor-specific locks residing in the memory, each processor-specific lock corresponding to one of the plurality of processors; and
   a task synchronization mechanism residing in the memory and executed by at least one of the plurality of processors, the task synchronization mechanism controlling access by the plurality of processors to a shared resource, the task synchronization mechanism updating one of the plurality of processor-specific locks when the requested access is a request for shared access to the shared resource, the task synchronization mechanism updating the global lock when the requested access is for exclusive access to the shared resource.

2. The apparatus of claim 1 wherein each processor-specific lock comprises a count of shared locks.

3. The apparatus of claim 2 wherein each processor-specific lock further comprises a mode setting that may be set to fast or slow.

4. The apparatus of claim 3 wherein the task synchronization mechanism reads the mode setting of a processor-specific lock, and determines whether to update the processor-specific lock and whether to update the global lock based on the mode setting of the processor-specific lock.

5. The apparatus of claim 1 wherein the task synchronization mechanism updates the global lock only when the plurality of processor-specific locks indicate the shared resource is not being shared.

6. The apparatus of claim 1 wherein the global lock comprises:
   a count of shared locks; and
   an exclusive lock.

7. The apparatus of claim 6 wherein the global lock further comprises a mode setting that may be set to fast or slow.

8. The apparatus of claim 7 wherein the task synchronization mechanism reads the mode setting of the global lock, and determines whether to update a processor-specific lock and whether to update the global lock based on the mode setting of the global lock.

9. An apparatus comprising:
   a plurality of processors;
   a memory coupled to the plurality of processors;
   a global lock residing in the memory, the global lock including an exclusive lock;
   a plurality of processor-specific locks residing in the memory, each processor-specific lock corresponding to one of the plurality of processors, each processor-specific lock including a count of shared locks; and a task synchronization mechanism residing in the memory and executed by at least one of the plurality of processors, the task synchronization mechanism controlling access by the plurality of processors to at least one shared resource, the task synchronization mechanism updating one of the plurality of processor-specific locks when the requested access is a request for shared access to a first shared resource, the task synchronization mechanism updating the global lock when the requested access is for exclusive access to the first shared resource and when the count of shared locks for the plurality of processor-specific locks indicate that none of the plurality of processor-specific locks are sharing the first shared resource.

10. The apparatus of claim 9 wherein each processor-specific lock further comprises a mode setting that may be set to fast or slow, wherein the task synchronization mechanism determines whether to update a processor-specific lock and whether to update the global lock based on the mode setting of a processor-specific lock.

11. The apparatus of claim 9 wherein the global lock further comprises a mode setting that may be set to fast or slow, wherein the task synchronization mechanism determines whether to update a processor-specific lock and whether to update the global lock based on the mode setting of the global lock.

12. A method for controlling access to a shared resource in a multiprocessor computer system, the method comprising the steps of:
 defining a global lock;
 defining a processor-specific lock for each processor in the multiprocessor computer system;
 updating one of the plurality of processor-specific locks when a requested access is a request for shared access to the shared resource; and
 updating the global lock when the requested access is for exclusive access to the shared resource.

13. The method of claim 12 wherein each processor-specific lock comprises a count of shared locks, and the step of updating one of the plurality of processor-specific locks comprises the step of changing the count of shared locks.

14. The method of claim 12 wherein the step of updating the global lock is performed only when the plurality of processor-specific locks indicate that none of the plurality of processor-specific locks are sharing the shared resource.

15. A method for controlling access to a shared resource in a multiprocessor computer system, the method comprising the steps of:
 (A) defining a global lock comprising:
  (A1) a shared lock that includes a count of shared locks;
  (A2) an exclusive lock; and
  (A3) a mode setting that may be set to fast or slow;
 (B) defining a processor-specific lock for each processor in the multiprocessor computer system, each processor-specific lock comprising:
  (B1) a count of shared locks; and
  (B2) a mode setting that may be set to fast or slow;
 (C) receiving a request for access to the shared resource;
 (D) reading the mode setting of a processor-specific lock that corresponds to the request;
 (E) if the mode setting of the processor-specific lock is fast, and if the request for access is a request for shared access, updating one of the plurality of processor-specific locks;
 (F) if the mode setting of the processor-specific lock is slow, performing the steps of:
  (F1) reading the mode setting of the global lock;
  (F2) if the mode setting of the global lock is fast, updating one of the plurality of processor-specific locks; and
  (F3) if the mode setting of the global lock is slow and if the shared count of each processor-specific lock is zero, updating the exclusive lock.

16. A computer-readable program product comprising:
 (A) a task synchronization mechanism that controls access to a shared resource using a global lock and a plurality of processor-specific locks, the task synchronization mechanism updating one of the plurality of processor-specific locks when a requested access is a request for shared access to the shared resource, the task synchronization mechanism updating the global lock when the requested access is for exclusive access to the shared resource; and
 (B) recordable signal bearing media bearing the task synchronization mechanism.

17. The program product of claim 16 wherein each processor-specific lock comprises a count of shared locks.

18. The program product of claim 17 wherein each processor-specific lock further comprises a mode setting that may be set to fast or slow.

19. The program product of claim 18 wherein the task synchronization mechanism reads the mode setting of a processor-specific lock, and determines whether to update a processor-specific lock and whether to update the global lock based on the mode setting of a processor-specific lock.

20. The program product of claim 16 wherein the task synchronization mechanism updates the global lock only when the plurality of processor-specific locks indicate the shared resource is not being shared.

21. The program product of claim 16 wherein the global lock comprises:
 a count of shared locks; and
 an exclusive lock.

22. The program product of claim 21 wherein the global lock further comprises a mode setting that may be set to fast or slow.

23. The program product of claim 22 wherein the task synchronization mechanism reads the mode setting of the global lock, and determines whether to update a processor-specific lock and whether to update the global lock based on the mode setting of the global lock.

24. A computer-readable program product comprising:
 (A) a task synchronization mechanism that controls access by a plurality of processors to a shared resource using a global lock that includes an exclusive lock and a plurality of processor-specific locks that each include a count of shared locks, the task synchronization mechanism updating one of the plurality of processor-specific locks when a requested access is a request for shared access to a first shared resource, the task synchronization mechanism updating the global lock when the requested access is for exclusive access to the first shared resource and when the count of shared locks for the plurality of processor-specific locks indicate the shared resource is not being shared; and
 (B) recordable signal bearing media bearing the task synchronization mechanism.

* * * * *